United States Patent
Jong-Seon et al.

(10) Patent No.: US 8,526,517 B2
(45) Date of Patent: Sep. 3, 2013

(54) BLIND SLM AND PTS METHOD WITH LOW DECODING COMPLEXITY OF OFDM SIGNALS

(75) Inventors: No Jong-Seon, Seoul (KR); Shin Dong-Joon, Seoul (KR); Joo Hyun-Seung, Seoul (KR); Heo Seok-Joong, Seoul (KR); Jeon Hyun-Bae, Incheon (KR)

(73) Assignee: SNU R&DB Foundation, Seoul (KR)

( * ) Notice: Subject to any disclaimer, the term of this patent is extended or adjusted under 35 U.S.C. 154(b) by 778 days.

(21) Appl. No.: 12/580,631

(22) Filed: Oct. 16, 2009

(65) Prior Publication Data

US 2011/0090972 A1    Apr. 21, 2011

(51) Int. Cl.
    *H04K 1/10* (2006.01)
(52) U.S. Cl.
    USPC .......... 375/260; 375/267; 375/262; 375/299; 375/347; 375/349
(58) Field of Classification Search
    USPC ................. 375/260, 267, 262, 299, 347, 349
    See application file for complete search history.

(56) References Cited

PUBLICATIONS

Zolghadrasli et al., PAPR reduction in OFDM system by using Hadamard transformation in BSLM techniques, 2007, IEEE, pp. 1-4.*

* cited by examiner

*Primary Examiner* — Kabir A Timory
(74) *Attorney, Agent, or Firm* — Renner, Otto, Boisselle & Sklar, LLP (57) ABSTRACT

Disclosed is a BSLM method of generating U independent alternative symbol sequences by changing a phase of symbol sequences by phase sequences and transmitting the alternative symbol sequences with a PAPR to lower the PARR of a transmission signal of a transmitter in an OFDM system. The transmitter uses m-sequences as the phase sequence and a receiver uses an ML decoder to distinguish the phase sequence. The BSLM method includes rotating phases in blocks according to the m-sequences used in the respective symbol sequences, selecting a signal sequence with a minimum PAPR among U alternative signal sequences generated by the m-sequences in the transmitter, and partitioning U alternative symbol sequences into U/2 blocks in the transmitter. Block partitioning and predetermined phase rotation are used to embed side information in an alternative signal sequence, and the BSLM scheme may be extended to a BPTS. Since low decoding complexity is given while detecting side information, the same BER performance is obtained as that of the conventional BSLM scheme in the AWGN channel.

6 Claims, 9 Drawing Sheets

BLIND SLM AND PTS METHOD WITH LOW DECODING COMPLEXITY OF OFDM SIGNALS

BACKGROUND OF THE INVENTION

1. Field of the Invention

The present invention relates to blind selective mapping (BSLM) and blind partial transmit sequence (BPTS) schemes with low decoding complexity for peak to average power ratio (PAPR) reduction of an orthogonal frequency division multiplexing (OFDM) signal. More particularly, the present invention relates to BSLM and BPTS schemes with low decoding complexity for PAPR reduction of an OFDM signal, in which m-sequences are used as phase sequences and a maximum likelihood (ML) decoder with low decoding complexity is used, so that a receiver can decide the phase sequence used in the transmitter, thereby decreasing decoding complexity while minimally degrading bit error rate (BER) performance.

2. Description of the Related Art

Orthogonal frequency division multiplexing (OFDM) is an efficient method for high speed data transmission in multipath fading. In addition, it is possible to significantly enhance the throughput by adapting a data rate per subcarrier from decomposition of a wideband channel. However, a major disadvantage of OFDM is the high peak to average power ratio (PAPR) of the transmitter's output signal, where the range of PAPR is proportional to the number of subcarriers. Due to the high PAPR feature, an OFDM signal can suffer significant inter-modulation and undesired out-of-band radiation when it passes through nonlinear devices, e.g., a high power amplifier (HPA).

Several PAPR reduction schemes have been proposed such as clipping and filtering, coding, selected mapping (SLM), partial transmit sequence (PTS), and tone reservation (TR). SLM and PTS, symbol scrambling techniques, can reduce the peak power of OFDM signals without signal distortion. The key idea of SLM is that the OFDM signal with the smallest PAPR is selected for transmission from several alternative OFDM signals which are obtained by applying inverse fast Fourier transform (IFFT) to each alternative symbol sequence that is an input symbol sequence multiplied by one of the phase sequences. In the PTS scheme, the input symbol sequence is partitioned into a number of disjointed subsequences. IFFT is applied to respective subsequences and the signals of subsequences are summed after they are multiplied by a set of rotating factors.

In SLM and PTS, the side information must be transmitted to enable the receiver to search the original OFDM symbol sequence. Such side information causes slight degradation in bandwidth efficiency. Moreover, incorrect detection of side information at to the receiver results in critical degradation of bit error rate (BER). For this reason, the side information must be highly protected so as not to affect the error performance of OFDM systems. Several blind SLM (BSLM) and blind PTS (BPTS) schemes to eliminate the need for side information have been studied. Maximum Likelihood (ML) decoders, which exhibit good BER performance, are derived for the BSLM and BPTS schemes. However, the conventional BSLM and BPTS schemes result in large decoding complexity at the receiver.

In the OFDM systems, an input symbol sequence $X=[X_0, X_1, \ldots, X_{N-1}]$ is given as a vector of complex-valued symbols with the time duration Ts. After splitting the serial data into parallel data streams, all substreams are summed by applying IFFT.

The discrete time OFDM signal after IFFT is given as Expression 1:

$$x_k = \frac{1}{\sqrt{N}} \sum_{n=0}^{N-1} X_n e^{j2\pi \frac{n}{N} k}, \quad 0 \leq k \leq N-1$$

where $X_n$ is the input data symbol loaded on the n-th subcarrier and N is the number of the subcarriers. X is a vector of N constellation symbols from a given constellation Q. The size of Q is q.

Let $x=[x_0, x_1, \ldots, x_{N-1}]$ be an OFDM signal sequence. The PAPR of x is defined by Expression 2:

$$PAPR(x) \triangleq \frac{\max_{0 \leq k \leq N-1} |x_k|^2}{E\{|x_k|^2\}}$$

where $E\{\cdot\}$ denotes the expectation. When all of 1 sequences are an input to N-point IFFT, the output signal is an impulse sequence with amplitude $\sqrt{N}$ at k=0. Thus, the theoretical maximum of the PAPR for N number of subcarriers is 10 log(N) dB.

Below, the conventional BSLM will be described.

For an input symbol sequence X, SLM generates U independent alternative symbol sequences and transmits the OFDM signal sequence with the minimum PAPR. U alternative symbol sequences are generated by multiplying X by U phase sequences. Suppose that U phase sequences are given as Expression 3:

$$P^u = [e^{j\phi_0^u}, e^{j\phi_1^u}, \ldots, e^{j\phi_{N-1}^u}]$$

where $\phi_n^u \in [0, 2\pi)$ and $u \in \{1, 2, \ldots U\}$. Let $a \otimes b$ represent the componentwise multiplication of vectors a and b. For an input symbol sequence X, $x^{\tilde{u}}=\text{IFFT}(X \otimes P^{\tilde{u}})$ with the minimum PAPR among U alternative signal sequences $x^u=\text{IFFT}(X \otimes P^u)$, $1 \leq u \leq U$ is selected for transmission. The index $\tilde{u}$ of the selected phase sequence should be transmitted to the receiver in the SLM scheme.

In order to eliminate transmission of the side information, a BSLM scheme wherein the indices are embedded into alternative signal sequences without loss of data rate was proposed in the related art. BSLM enables the receiver to distinguish the selected phase sequence from others without transmitting any side information.

It is assumed that the receiver receives $r=x^{\tilde{u}}+n$, where $r=[r_1, r_2, \ldots, r_{N-1}]=\text{FFT}(R)$ and R is a received symbol sequence. To derive the input symbol sequence without the side information $\tilde{u}$ from r at the receiver, U phase sequences in the BSLM scheme should have the following properties:

1. The set of $P^u$'s is fixed and known a priori; and
2. $X \otimes P^u$ and $X \otimes P^v$ are sufficiently different for $u \neq v$.

To decode the input symbol sequence at the receiver, each phase $\phi_n^u$ for all n and u must satisfy the condition of $X_n e^{j\phi_n^u} \notin Q$. The set of $P^u$ should be duly chosen to ensure this condition. If $u \neq \tilde{u}$ and channel noise is not considered in decoding OFDM symbols, each element of $R \otimes P^{u*}$ will not be a symbol in the constellation Q where $P^{u*}$ is the conjugate of $P^u$. Therefore, by using this result, a simplified ML decoder for the BSLM scheme can be derived to recover the OFDM symbol without the side information. Specially, when the Euclidian distance between any $P^u$ and $P^v$ is very large, BER performance of the ML decoder is expected to be very good.

The received symbol $R_n$ after the FFT demodulation at the receiver may be written as Expression 4:

$$R_n = G_n X_n e^{j\phi_n^{\tilde{u}}} + \hat{N}_n$$

where $G_n$ is the frequency response of the fading channel at the n-th subcarrier and $\hat{N}_n$ is an additive white complex Gaussian noise (AWGN) sample at the nth subcarrier.

Without the side information of ũ, the optimal ML decoder computes the decision metric for decoding the received symbol sequence R. The optimal metric of the ML decoder is given as Expression 5:

$$D_{opt} = \min_{\substack{[\hat{x}_0, \hat{x}_1, \ldots, \hat{x}_{N-1}] \in Q^N \\ P^u, u \in \{1,2,\ldots,U\}}} \sum_{n=0}^{N-1} |R_n e^{-j\phi_n^u} - G_n \hat{X}_n|^2$$

where |·| denote the absolute value of a complex number. This algorithm has to search all $q^N$ symbols for q-ary constellations that are repeated for each of $P^1, P^2, \ldots, P^U$.

Consequently, the overall decoding complexity to compute Expression 5 is $Uq^N|\cdot|^2$ operations.

Since decoding complexity from real additions is negligible as compared to that of |·|² operations, the additions will be ignored. Since the decoder exhaustively searches all input symbol sequences, it can be performed only for small N. Thus, a suboptimal decoding method with reduced complexity should be derived.

Assume that $R_n$ is detected into the nearest constellation point $\hat{X}_n$. That is, a soft decision value is made for each subcarrier unlike the optimal ML decoder and the nearest constellation point from $R_n$ is saved for each subcarrier. This process is repeated for $1 \leq u \leq U$. Therefore, the suboptimal decision metric of the ML decoder may be written as Expression 6:

$$D_{so} = \min_{P_u, u \in \{1,2,\ldots,U\}} \sum_{n=0}^{N-1} \min_{\hat{X}_n \in Q} |R_n e^{-j\phi_n^u} - G_n \hat{X}_n|^2$$

The input symbol sequence is recovered from the decoded symbol sequence having $D_{so}$. Though the complexity of suboptimal decoder is reduced to $UqN|\cdot|$ operations, it is still not practical.

SUMMARY OF THE INVENTION

The present invention is directed to solving the problems of the conventional blind selective mapping (BSLM) as described above, and an aspect of the invention is to provide a BSLM scheme and a blind partial transmit sequence (BPTS) scheme having fewer operations for lowering a peak to average power ratio (PAPR) of an orthogonal frequency division multiplexing (OFDM) signal. Specifically, the invention is directed to providing a BSLM scheme and a BPTS scheme extended from a similar idea of the BSLM scheme, with low decoding complexity for PAPR reduction of an OFDM signal, and in which m-sequences are used as phase sequences, a maximum likelihood (ML) decoder with low decoding complexity is used so that a receiver can decide the phase sequence used in the transmitter, and block partition and phase rotation are used so that the transmitter can transmit the side information embedded in the OFDM symbol sequence to the receiver, thereby decreasing decoding complexity while minimally degrading bit error rate (BER) performance.

According to an aspect, the present invention provides a blind selective mapping (BSLM) method of generating U independent alternative symbol sequences by changing a phase of symbol sequences by phase sequences and transmitting the alternative symbol sequences with a minimum peak to average power ratio (PAPR) in an orthogonal frequency division multiplexing (OFDM) system, wherein the transmitter uses m-sequences as the phase sequence and a receiver uses a maximum likelihood (ML) decoder to distinguish the phase sequence used by the transmitter. The BSLM method includes: partitioning U alternative symbol sequences into U/2 blocks in the transmitter; rotating phases in each block for each alternative symbol sequence that is an input symbol sequence multiplied by the m-sequence; and selecting a signal sequence with a minimum PAPR among U alternative signal sequences generated by the m-sequences in the transmitter.

The m-sequences may be expressed by $P^u = [P_0^u, P_1^u, \ldots, P_{N-1}^u]$, where $P_i^u \in \{+1, -1\}$, $0 \leq i \leq N-1$, $u \in \{1, 2, \ldots, U\}$, and N is the number of subcarriers.

The partitioning may include dividing a u-th alternative symbol sequence $X \otimes P^u$ into L sub-blocks as $[X_1^u, X_2^u, \ldots, X_L^u]$ if $X = [X_0, X_1, \ldots, X_{N-1}]$, where $$X_v^u = [X_{\frac{N(v-1)}{L}} P_{\frac{N(v-1)}{L}}, X_{\frac{N(v-1)}{L}+1} P_{\frac{N(v-1)}{L}+1}, \ldots, X_{\frac{Nv}{L}-1} P_{\frac{Nv}{L}-1}]$$

is the v-th sub-block with size N/L.

If U L-tuple phase rotation vectors are defined as $W^u = [w_1^u, w_2^u, \ldots, w_L^u]$, where $w_v^u \in \{0, 1\}$, $1 \leq u \leq U$ and $1 \leq v \leq L$, each element in the v-th sub-block of the u-th alternative symbol sequence may be multiplied by $e^{\theta w_v^u}$, where $0 < \theta \leq \pi/2$, $1 \leq u \leq L$, and $1 \leq v \leq L$, such that each element in the sub-blocks with $w_v^u = 0$ is modulated by using a signal constellation $S_0$ and each element in the sub-blocks with $w_v^u = 1$ is modulated by using a signal constellation $S_1$.

The phase rotation vectors may include U bi-orthogonal vectors of length L=U/2.

After partitioning, the ML decoder in each sub-block may calculate a value by two different metrics, the two different metrics being given as $$D_{v,w_v^u} = \sum_{n=\frac{2N(v-1)}{U}}^{\frac{2Nv}{U}-1} \min_{\hat{X}_n \in S_0} |R_n e^{-j\theta w_v^u} - G_n \hat{X}_n|^2$$

where $w_v^u \in \{0, 1\}$, $v \in \{1, 2, \ldots, U/2\}$, $R_n$ is a received symbol after fast Fourier transform (FFT) demodulation at the receiver, $G_n$ is a frequency response of the fading channel at an n-th subcarrier, and $\hat{X}_n$ is a constellation point of $S_0$.

After the calculation, the ML decoder may calculate and derotate the alternative symbol sequence by a decision metric and finally decides an input symbol sequence, the decision metric being given as $$D_u = \min_{W^u} \sum_{v=1}^{\frac{U}{2}} D_{v,w_v^u}.$$

With this configuration, the invention provides a novel BSLM with low decoding complexity. As compared with a conventional blind method, detection failure of side information can be decreased. One input symbol sequence is multiplied by phase sequences so as to generate alternative symbol sequences, and side information of each alternative symbol sequence is then embedded in the alternative symbol sequence through the block partition and the predetermined phase rotation.

Further, the BSLM scheme according to this invention may be extended to a blind partial transmit sequence (PTS). This will be described in more detail hereinafter.

According to another aspect, the invention provides a blind partial transmit sequence (PTS) method of partitioning an input symbol sequence X into V disjointed symbol subsequences $X_v=[X_{v,0}, X_{v,1}, \ldots, X_{v,N-1}]$, and multiplying each subsequence by a rotating factor $b_v$ with $|b_v|=1$ for PAPR reduction of an orthogonal frequency division multiplexing (OFDM) signal. The blind PTS method includes: choosing the rotating factor $b_v$ from a given set $\mathbb{B}=\{+1, e^{j3\pi/4}\}$.

If $b_v$ is chosen from a given set $\mathbb{B}=\{+1, e^{j3\pi/4}\}$, a decision metric of a maximum likelihood (ML) decoder in a BPTS scheme may be written as $$D_{pts} = \min_{[b_1,\ldots,b_V]} \sum_{v=1}^{V} \sum_{n=\frac{N(v-1)}{V}}^{\frac{Nv}{V}-1} \min_{\hat{X}_n \in S_0} |R_n b_v^{-1} - G_n \hat{X}_n|^2$$

where $S_0$ and $S_1$ are constellation points for $b_v=+1$ and $e^{j3\pi/4}$, respectively, $R_n$ is a received symbol after fast Fourier transform (FFT) demodulation at the receiver, $G_n$ is a frequency response of the fading channel at an n-th subcarrier, and $\hat{X}_n$ is a constellation point of $S_0$.

BRIEF DESCRIPTION OF THE DRAWINGS

The above and other aspects, features and advantages of the invention will become apparent from the following detailed description in conjunction with the accompanying drawings, in which.

DETAILED DESCRIPTION OF THE EMBODIMENTS

Embodiments of the invention will hereinafter be described in more detail with reference to the accompanying drawings. Herein, reference numerals given to elements are consistent throughout the drawings, and thus elements having like reference numerals throughout the drawings must be interpreted as having like configurations and functions.

Embodiment 1

A novel BSLM scheme using bi-orthogonal vectors according to an embodiment of the invention will be described.

Instead of randomly selecting each element $\phi_n^u$ of a conventional phase sequence, the BSLM scheme according to this embodiment uses an m-sequence and its cyclic shifts with zero padding as phase sequences, $P^u=[P_0^u, P_1^u, \ldots, P_{N-1}^u]$, where $P_i^u \in \{+1, -1\}, 0 \leq i \leq N-1$, and $u \in \{1, 2, \ldots, U\}$. In fact, $P^u$ corresponds to rows of a cyclic Hadamard matrix constructed from m-sequences. It is known that m-sequences satisfy the optimal condition for the phase sequence in the SLM schemes.

In order to embed side information of the phase sequences into alternative symbol sequences without loss of data rate, block partitioning and predetermined phase rotation are used in the BSLM scheme according to this embodiment as follows. Assume that U phase sequences are used. The u-th alternative symbol sequence $X \otimes P^u$ is divided into L sub-blocks as $[X_1^u, X_2^u, \ldots, X_L^u]$, where $$X_v^u = \left[ X_{\frac{N(v-1)}{L}} P_{\frac{N(v-1)}{L}}, X_{\frac{N(v-1)}{L}+1} P_{\frac{N(v-1)}{L}+1}, \ldots, X_{\frac{Nv}{L}-1} P_{\frac{Nv}{L}-1} \right]$$

is the v-th sub-block with size N/L. U L-tuple phase rotation vectors are defined as Expression 7:

$$W^u = [w_1^u, w_2^u, \ldots, w_L^u]$$

where $w_v^u \in \{0, 1\}, 1 \leq u \leq U$ and $1 \leq v \leq L$. Each element in the v-th sub-block of the u-th alternative symbol sequence is multiplied by $e^{\theta w_v^u}$, where $0 < \theta \leq \pi/2$ and $1 \leq v \leq L$. In other words, the phase of each element in the v-th sub-block of the u-th alternative symbol sequence is rotated by $\theta w_v^u$. It is equivalent to use two signal constellations such that each element in the sub-blocks with $w_v^u=0$ is modulated by using the signal constellation $S_0$ and each element in the sub-blocks with $w_v^u=1$ is modulated by using the signal constellation $S_1$, which is obtained by rotating the signals in $S_0$ by $\theta$. Here, the u-th alternative symbol sequence may be written as Expression 8:

$$X^u = [X_1^u e^{j\theta w_1^u}, X_2^u e^{j\theta w_2^u}, \ldots, X_L^u e^{j\theta w_L^u}]$$

Now, the optimal $\theta$ is derived to construct U L-tuple phase rotation vectors $W^u$, which maximize the detection probability of the index of the selected phase sequence at the receiver. It is not difficult to derive the following design criteria for the phase rotation vectors:

1. The sub-block size should be as large as possible;
2. The Euclidian distance between alternative symbol sequences obtained by applying phase rotation vectors should be as large as possible.

It is not difficult to check that the U bi-orthogonal vectors of length L=U/2 satisfy the above criteria. It should be noted that U bi-orthogonal vectors of length U/2 are U/2 orthogonal vectors of length U/2 and their bit-complement vectors. Actually, $L=\log_2 U$ gives the largest size of sub-block which satisfies the first criterion. However, any U rotation vectors of length $L=\log_2 U$ do not satisfy the larger Euclidian distance between alternative symbol sequences obtained by applying rotation vectors compared to U bi-orthogonal vectors of length L=U/2. Since the Euclidian distance between alternative symbol sequences is more important than the sub-block size, U bi-orthogonal vectors of length U/2 may be used as rotation vectors in this embodiment. On the other hand, θ must be chosen so as to maximize the minimum Euclidean distance between $S_0$ and $S_1$. For Quadrature Phase Shift Keying (QPSK) and 16 Quadrature Amplitude Modulation (QAM), θ=π/2 is chosen.

Figure 1:
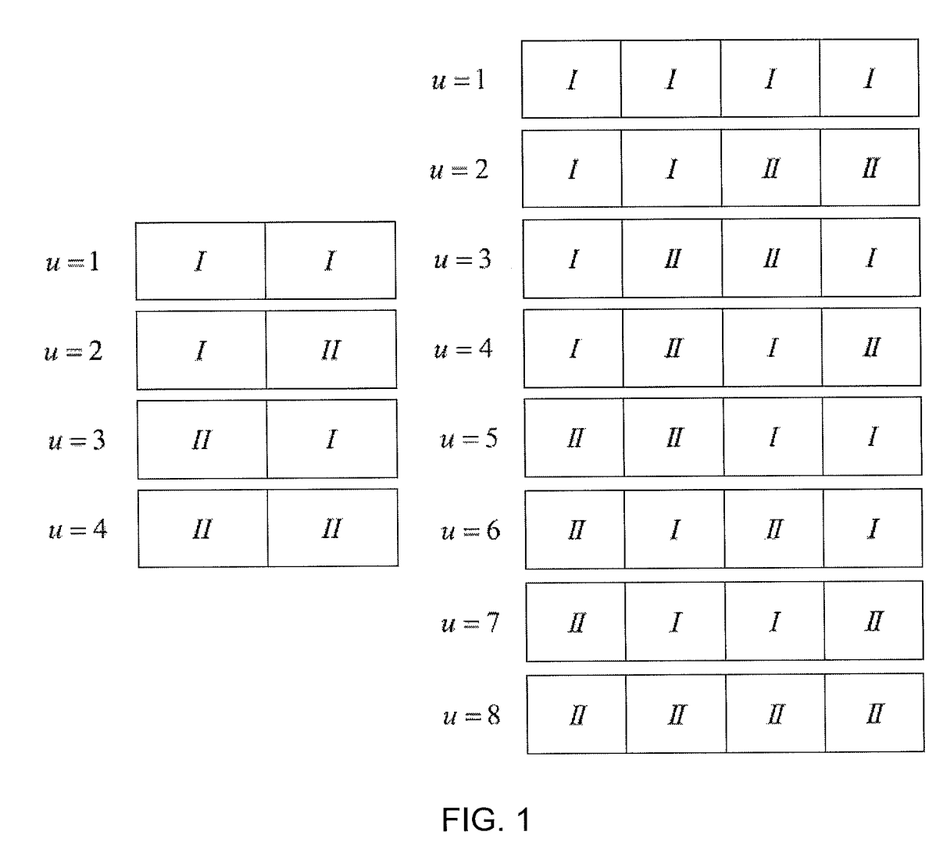
FIG. 1 shows examples of block partitioning and predetermined phase rotation to embed side information for U=4 and 8.

FIG. 1 shows examples of block partitioning and predetermined phase rotation to embed side information for U=4 and 8. In FIG. 1, the bi-orthogonal vectors for U=4 and 8 are given as Expression 9:

For U = 4, {(00), (01), (10), (11)}.

For U = 8,

{(0000), (0011), (0110), (0101), (1100), (1010), (1001), (1111)}.

FIG. 1 shows the examples of the block partitioning by U bi-orthogonal vectors of length L=U/2 with U=4 and 8, where I and II correspond to $w_v^u=0$ and $w_v^u=1$, respectively.

In this embodiment, an ML decoder with low complexity is derived instead of the conventional BSLM decoder. Specifically, two metrics for each sub-block corresponding to $S_0$ and $S_1$ may be derived. $R_n$ is allowed to be detected at the nearest constellation point on $S_0$, similar to the suboptimal ML decoder of the conventional BSLM scheme. In other words, a soft decision value for each subcarrier is calculated, the nearest constellation point from $R_n$ is saved for each subcarrier, and all of 2N/U metrics in the sub-block are added. This process is repeated for $1 \leq v \leq U/2$. On the other hand, the points on the signal constellation $S_1$ must be considered by the ML decoder. Using $R_n$ derotated by θ, this process is also repeated for $1 \leq v \leq U/2$ for decoding the symbols on $S_1$.

Table 1 shows comparison of decoding complexity of the conventional BSLM and the BSLM according to this embodiment for U=4, 8, and 16.

TABLE 1

|  | U = 4 | U = 8 | U = 16 |
|---|---|---|---|
| Conventional Blind SLM | 4qN | 8qN | 16qN |
| New Blind SLM | 2qN | 2qN | 2qN |
| DCRR | 50% | 75% | 87.5% |

Therefore, the metric of the ML decoder in each sub-block may be written as Expression 10:

$$D_{v,w_v^u} = \sum_{n=\frac{2N(v-1)}{U}}^{\frac{2Nv}{U}-1} \min_{\hat{x}_n \in S_0} |R_n e^{-j\theta w_v^u} - G_n \hat{x}_n|^2$$

where $w_v^u \in \{0, 1\}$ and $$v \in \left\{1, 2, \ldots, \frac{U}{2}\right\}.$$

Two different metrics for each sub-block in the BSLM scheme according to this embodiment are calculated according to $w_v^u$, that is, $D_{v,0}$ and $D_{v,1}$.

The ML decoder chooses the minimum total metric summed by U/2 metrics of all sub-blocks from U bi-orthogonal vectors. The minimum Euclidian distance solution yields the transmitted alternative symbol sequence. Therefore, the decision metric of the ML decoder is given as Expression 11:

$$D_{\bar{u}} = \min_{W^u} \sum_{v=1}^{\frac{U}{2}} D_{v,w_v^u}$$

After finding the index $\bar{u}$ and yielding the alternative symbol sequence, $\hat{X}=[\hat{X}_0, \hat{X}_1, \ldots, \hat{X}_{N-1}]$, the input symbol sequence is determined by $\hat{X} \otimes P^{\bar{u}}$.

Figure 2:
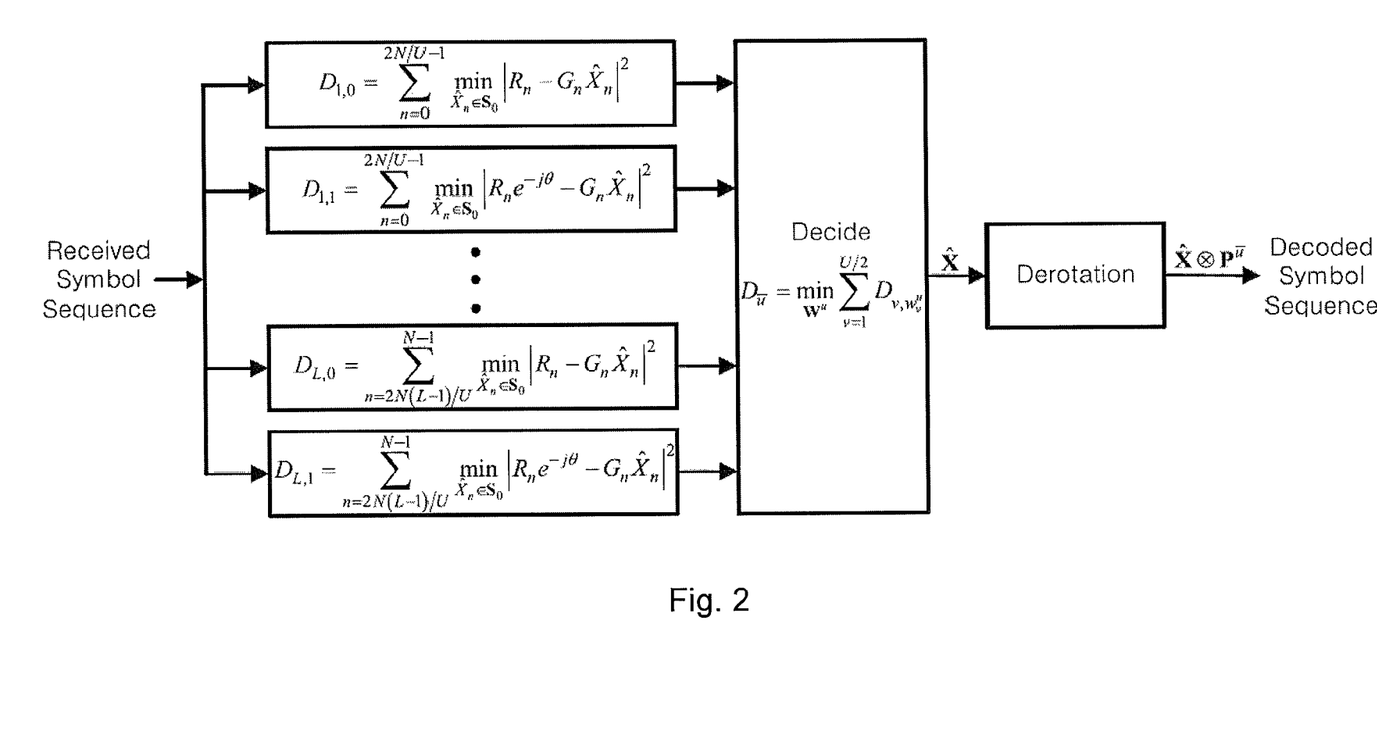
FIG. 2 is a block diagram of an ML receiver for BSLM according to one embodiment of this invention.

FIG. 2 shows a block diagram of an ML decoder for the BSLM according to this embodiment of the invention.

Regardless of U, total complexity of the BSLM according to this embodiment is only $2qN|\cdot|^2$ operations in the OFDM system of q-ary modulation. A decoding complexity reduction ratio (DCRR) of the BSLM according to this embodiment over the conventional BSLM is defined as Expression 12:

$$DCRR = \left(1 - \frac{A}{B}\right) \times 100$$

$$= \left(\frac{UqN - 2qN}{UqN}\right) \times 100$$

$$= \left(\frac{U-2}{U}\right) \times 100 \, (\%)$$

where A is the decoding complexity of the conventional BSLM and B is the decoding complexity of the BSLM according to this embodiment. Table 1 compares the decoding complexity of the conventional BSLM and the BSLM according to this embodiment for U=4, 8, and 16.

Embodiment 2

The novel BSLM scheme according to this embodiment may be extended to a partial transmit sequence (PTS). This will be described below in more detail.

An input symbol sequence X in the PTS scheme is partitioned into V disjointed symbol subsequences, $X_v=[X_{v,0}, X_{v,1}, \ldots, X_{v,N-1}]$, v=1, 2, ..., V satisfying Expression 13:

$$X = \sum_{v=1}^{V} X_v$$

Each symbol in the input symbol sequence X belongs to only one symbol subsequence $X_v$ called a sub-block. Due to disjoint $X_v$'s, for each given k, $0 \leq k \leq N-1$, $X_{v,k}=0$ except for subcarriers carrying the data. Then, each subsequence is multiplied by a rotating factor $b_v$ with $|b_v|=1$ as $$\acute{X} = \sum_{v=1}^{V} b_v X_v \qquad \text{[Expression 14]}$$

The rotating factor $b_v$ is chosen from a given set $\mathbb{B}$ which is usually $\mathbb{B} = \{+1, -1\}$. Using the linearity of the IFFT, the OFDM signal sequence in the time domain is given as Expression 15:

$$\begin{aligned}\acute{x} &= IFFT\left\{\sum_{v=1}^{V}b_{v}X_{v}\right\}\\ &= \sum_{v=1}^{V}b_{v}IFFT\{X_{v}\}\\ &= \sum_{v=1}^{V}b_{v}x_{v}.\end{aligned}$$

An optimized vector of rotating factors $\tilde{b}=[\tilde{b}_1, \ldots, \tilde{b}_v]$ for the minimum PAPR should be chosen. This is expressed as Expression 16:

$$\tilde{b} = [\tilde{b}_1, \ldots, \tilde{b}_V] = \underset{[b_1,\ldots,b_V]}{\operatorname{argmin}}\left(\max_{0\leq k\leq N-1}\left|\sum_{v=1}^{V}b_v x_{v,k}\right|\right)$$

Thus, the optimum transmit sequence is given as Expression 17:

$$\acute{x} = \sum_{v=1}^{V}\tilde{b}_v x_v$$

Expression 17 requires $\mathbb{B}^{V-1}$ iterations to obtain a vector $\tilde{b}$. The receiver of the PTS scheme needs side information of the vector $\tilde{b}$ for decoding the OFDM symbol sequence.

Embedding the side information of the BSLM according to this invention through the use of two signal constellations may be applied to the BPTS. Similar to the BSLM scheme according to this invention, $\mathbb{B}=\{+1, e^{j3\pi/4}\}$ is used rather than $\mathbb{B}=\{+1, -1\}$ for the BPTS scheme. If $\mathbb{B}=\{+1, e^{j3\pi/4}\}$ is used as in the BSLM according to this invention, PAPR performance of the BPTS is degraded compared with that of the conventional PTS as the distance between alternative OFDM signals is reduced. Let $S_0$ and $S_1$ be constellation points for $b_v=+1$ and $e^{j3\pi/4}$, respectively. Due to $\mathbb{B}=\{+1, e^{j3\pi/4}\}$, the side information of the vector $\tilde{b}$ is not transmitted to the receiver in the BPTS scheme.

An ML decoder for the BPTS scheme can also be easily derived. Similar to the ML decoder of the BSLM scheme according to this invention, it is necessary that the received $R_n$ find the nearest constellation point on $S_0$ and $S_1$. This process is repeated for $1\leq v\leq V$. Therefore, the decision metric of the ML decoder in the BPTS may be written as Expression 18:

$$D_{pts} = \min_{[b_1,\ldots,b_V]}\sum_{v=1}^{V}\sum_{n=\frac{N(v-1)}{V}}^{\frac{Nv}{V}-1}\min_{\hat{x}_n\in S_0}|R_n b_v^{-1} - G_n\hat{x}_n|^2$$

where $b_v \in \{1, e^{j3\pi/4}\}$. The vector of rotating factors can be determined using Expression 18, and an input symbol sequence is then recovered by $\hat{X}=[\hat{X}_0, \hat{X}_1, \ldots, \hat{X}_{N-1}]$ obtained from results of the decision metric. Similar to the BSLM according to this invention, total complexity of the BPTS according to this embodiment is also only $2qN|\cdot|^2$ operations in the OFDM system of q-ary modulation.

Analysis of detection failure probability (DFP) in this embodiment will hereinafter be described.

Detection failure of side information can seriously degrade BER of the OFDM system. Therefore, analysis of the detection failure probability (DFP) in the BSLM according to this invention is very important. It can be seen that that, for U=4 and 8, the decision metric for the decoder in Expression 11 is well operated over AWGN without detection failure of the side information in the high SNR region. It can also be seen from the simulation results in the next section that the BSLM scheme according to this invention has good performance of the side information detection over the AWGN channels.

The total BER $P_e$ at the receiver is given as Expression 19:

$$P_e = P_b(1-P_{df}) + P_{b|df}P_{df}$$

where $P_b$ is the BER when correct detection of side information is performed, $P_{b|df}$ is the BER when detection of side information fails, and $P_{df}$ is the DFP. When detection of the side information fails in Quadrature Phase Shift Keying (QPSK), $P_{b|df}$=0.5. Assume that a noise sample $\hat{N}_n$ has a mean of 0 and variance $\eta^2$. Since real value and imaginary value of $\hat{N}_n$ on a subcarrier are statistically independent, $\hat{N}_n$ can be expressed as Expression 20:

$$N_{re,n}Re\{\hat{N}_n\}=Re\{R_n e^{-j\Theta w_v^{\tilde{u}}}\}-Re\{G_n X_n\},$$

$$N_{im,n}=Im\{\hat{N}_n\}=Im\{R_n e^{-j\Theta w_v^{\tilde{u}}}\}-Im\{G_n X_n\}$$

where $G_n=1$ from the AWGN channel.

Assume that all elements of X have (1, 0) for QPSK and the alternative signal sequence which has no rotation with the minimum PAPR is selected for transmission.

That is, all subcarriers of the OFDM signal sequence use the $S_0$ constellation. Then $R_n$ can be given as $$R_n = 1 + N_{re,n} + jN_{im,n} \quad [\text{Expression 21}]$$

All $D_u$ values calculated from Expressions 10 and 11 are given as Expression 22:

$$D_1 = D_{1,0} + D_{2,0}$$

$$D_2 = D_{1,0} + D_{2,1}$$

$$D_3 = D_{1,1} + D_{2,0}$$

$$D_4 = D_{1,1} + D_{2,1}$$

Expression 23:

for $U=4$ and for $U=8$ $$D_1 = D_{1,0} + D_{2,0} + D_{3,0} + D_{4,0}$$

$$D_2 = D_{1,0} + D_{2,0} + D_{3,1} + D_{4,1}$$

$$D_3 = D_{1,0} + D_{2,1} + D_{3,0} + D_{4,0}$$

$$D_4 = D_{1,0} + D_{2,1} + D_{3,0} + D_{4,1}$$

$$D_5 = D_{1,1} + D_{2,1} + D_{3,0} + D_{4,0}$$

$$D_6 = D_{1,1} + D_{2,0} + D_{3,1} + D_{4,0}$$

$$D_7 = D_{1,1} + D_{2,0} + D_{3,0} + D_{4,1}$$

$$D_8 = D_{1,1} + D_{2,1} + D_{3,1} + D_{4,1}.$$

The detection success probability can be expressed as $$\begin{aligned}&Pr(D_1 < D_2, D_1 < D_3, D_1 < D_4) = \\ &\quad Pr(D_1 - D_2 < 0, D_1 - D_3 < 0, D_1 - D_4 < 0)\text{ for }U=4\end{aligned} \quad \text{Expression 24}$$

-continued $$Pr(D_1 < D_2, D_1 < D_3, D_1 < D_4, \quad \text{Expression 25}$$
$$D_1 < D_5, D_1 < D_6, D_1 < D_7, D_1 < D_8) =$$
$$Pr(D_1 - D_2 < 0, D_1 - D_3 < 0, D_1 - D_4 < 0,$$
$$D_1 - D_5 < 0, D_1 - D_6 < 0,$$
$$D_1 - D_7 < 0, D_1 - D_8 < 0) \text{ for } U = 8.$$

Using Expressions 22 and 23, 24 and 25 can be rewritten as $$Pr(D_1 < D_2, D_1 < D_3, D_1 < D_4) = \quad \text{Expression 26}$$
$$Pr(D_{1,0} + D_{2,0} - D_{1,0} - D_{2,1} < 0,$$
$$D_{1,0} + D_{2,0} - D_{1,1} - D_{2,0} < 0,$$
$$D_{1,0} + D_{2,0} - D_{1,1} - D_{2,1} < 0) = Pr(D_{1,0} - D_{1,1} < 0,$$
$$D_{2,0} - D_{2,1} < 0, D_{1,0} + D_{2,0} - D_{1,1} - D_{2,1} < 0) =$$
$$Pr(D_{1,0} - D_{1,1} < 0, D_{2,0} - D_{2,1} < 0)$$

$$Pr(D_1 < D_2, D_1 < D_3, D_1 < D_4, D_1 < D_5, D_1 < D_6, \quad \text{Expression 27}$$
$$D_1 < D_7, D_1 < D_8) = Pr(D_{1,0} - D_{1,1} + D_{2,0} - D_{2,1} < 0,$$
$$D_{1,0} - D_{1,1} + D_{3,0} - D_{3,1} < 0,$$
$$D_{1,0} - D_{1,1} + D_{4,0} - D_{4,1} < 0,$$
$$D_{2,0} - D_{2,1} + D_{3,0} - D_{3,1} < 0,$$
$$D_{2,0} - D_{2,1} + D_{4,0} - D_{4,1} < 0,$$
$$D_{3,0} - D_{3,1} + D_{4,0} - D_{4,1} < 0, D_{1,0} - D_{1,1} +$$
$$D_{2,0} - D_{2,1} + D_{3,0} - D_{3,1} + D_{4,0} - D_{4,1} < 0).$$

Since each sub-block is statistically independent, Expressions 26 and 27 are modified as $$Pr(D_{1,0} - D_{1,1} < 0, D_{2,0} - D_{2,1} < 0) = \quad \text{Expression 28}$$
$$Pr(D_{1,0} - D_{1,1} < 0)Pr(D_{2,0} - D_{2,1} < 0) =$$
$$Pr(D_{1,0} - D_{1,1} < 0)^2$$

$$Pr(D_{1,0} - D_{1,1} + D_{2,0} - D_{2,1} < 0, \quad \text{Expression 29}$$
$$D_{1,0} - D_{1,1} + D_{3,0} - D_{3,1} < 0,$$
$$D_{1,0} - D_{1,1} + D_{4,0} - D_{4,1} < 0,$$
$$D_{2,0} - D_{2,1} + D_{3,0} - D_{3,1} < 0,$$
$$D_{2,0} - D_{2,1} + D_{4,0} - D_{4,1} < 0, D_{3,0} -$$
$$D_{3,1} + D_{4,0} - D_{4,1} < 0, D_{1,0} - D_{1,1} + D_{2,0} - D_{2,1} +$$
$$D_{3,0} - D_{3,1} + D_{4,0} - D_{4,1} < 0) = Pr(D_{1,0} - D_{1,1} <$$
$$0, D_{2,0} - D_{2,1} < 0, D_{3,0} - D_{3,1} < 0, D_{4,0} - D_{4,1} < 0) +$$
$$Pr(D_{1,0} - D_{1,1} > 0, D_{2,0} - D_{2,1} < -(D_{1,0} - D_{1,1}), D_{3,0} -$$
$$D_{3,1} < -(D_{1,0} - D_{1,1}), D_{4,0} - D_{4,1} < -(D_{1,0} - D_{1,1})) +$$
$$Pr(D_{2,0} - D_{2,1} > 0, D_{1,0} - D_{1,1} < -(D_{2,0} - D_{2,1}), D_{3,0} -$$
$$D_{3,1} < -(D_{2,0} - D_{2,1})D_{4,0} - D_{4,1} < -(D_{2,0} - D_{2,1})) +$$
$$Pr(D_{3,0} - D_{3,1} > 0, D_{1,0} - D_{1,1} < -(D_{3,0} - D_{3,1}), D_{2,0} -$$
$$D_{2,1} < -(D_{3,0} - D_{3,1}), D_{4,0} - D_{4,1} < -(D_{4,0} - D_{4,1})) +$$
$$Pr(D_{4,0} - D_{4,1} > 0, D_{1,0} - D_{1,1} < -(D_{4,0} - D_{4,1}), D_{2,0} -$$
$$D_{2,1} < -(D_{4,0} - D_{4,1}), D_{3,0} - D_{3,1} < -(D_{4,0} - D_{4,1})) =$$
$$Pr(D_{1,0} - D_{1,1} < 0)^4 + 4Pr(D_{1,0} - D_{1,1} > 0, D_{2,0} -$$
$$D_{2,1} < -(D_{1,0} - D_{1,1}), D_{3,0} - D_{3,1} < -(D_{1,0} - D_{1,1}),$$
$$D_{4,0} - D_{4,1} < -(D_{1,0} - D_{1,1})) = Pr(D_{1,0} - D_{1,1} < 0)^4 +$$
$$4 \int_0^\infty Pr(D_{1,0} - D_{1,1} = \alpha)Pr(D_{2,0} - D_{2,1} < -\alpha,$$
$$D_{3,0} - D_{3,1} < -\alpha, D_{4,0} - D_{4,1} < -\alpha | D_{1,0} - D_{1,1} = \alpha)d\alpha =$$
$$D_{4,0} - D_{4,1} < -(D_{1,0} - D_{1,1})) = Pr(D_{1,0} - D_{1,1} < 0)^4 +$$
$$4 \int_0^\infty Pr(D_{1,0} - D_{1,1} = \alpha)Pr(D_{2,0} - D_{2,1} < -\alpha,$$
$$D_{3,0} - D_{3,1} < -\alpha, D_{4,0} - D_{4,1} < -\alpha | D_{1,0} - D_{1,1} = \alpha)d\alpha =$$
$$Pr(D_{1,0} - D_{1,1} < 0)^4 +$$
$$4 \int_0^\infty Pr(D_{1,0} - D_{1,1} = \alpha)Pr(D_{2,0} -$$
$$D_{2,1} < -\alpha, D_{3,0} - D_{3,1} < -\alpha, D_{4,0} - D_{4,1} < -\alpha)d\alpha =$$
$$Pr(D_{1,0} - D_{1,1} < 0)^4 + 4 \int_0^\infty Pr(D_{1,0} - D_{1,1} = \alpha)$$
$$Pr(D_{2,0} - D_{2,1} < -\alpha)Pr(D_{3,0} - D_{3,1} < -\alpha)$$
$$Pr(D_{4,0} - D_{4,1} < -\alpha)d\alpha = Pr(D_{1,0} - D_{1,1} < 0)^4 +$$
$$4 \int_0^\infty Pr(D_{1,0} - D_{1,1} = \alpha)Pr(D_{2,0} - D_{2,1} < -\alpha)^3 d\alpha.$$

Then, the DFP can be expressed as $$P_{df,U=4} = 1 - Pr(D_{1,0} - D_{1,1} < 0)^2 \quad \text{Expression 30}$$

$$P_{df,U=8} = 1 - Pr(D_{1,0} - D_{1,1} < 0)^4 - \quad \text{Expression 31}$$
$$4 \int_0^\infty Pr(D_{1,0} - D_{1,1} = \alpha)Pr(D_{2,0} - D_{2,1} < -\alpha)^3 d\alpha$$

Since DFP for U larger than U=8 can be derived in the same manner as when U=4 and 8, a description of DFP for U larger than 8 will be omitted herein.

In order to calculate $Pr(D_{1,0} - D_{1,1} < 0)$ in Expressions 30 and 31, it is necessary know the probability distribution of $D_{v,0} - D_{v,1}$ on QPSK. Let $m_i$, $1 \leq i \leq 8$, be the number of $R_n$ in each sub-block such that $$\arg(R_n) \in \left[\frac{(i-1)\pi}{4}, \frac{i\pi}{4}\right).$$

That is, we have $$\sum_{i=1}^8 m_i : \frac{2N}{U}.$$

Using Expression 21, $D_{v,0}$ in $S_0$ and $D_{v,1}$ in $S_1$ may be given as $$D_{v,0} = \quad \text{Expression 32}$$
$$\sum_{k=1}^{m_1}(N_{re,k}^2 + N_{im,k}^2) + \sum_{k=1}^{m_2}\{(N_{re,k} + 1)^2 + (N_{im,k} - 1)^2\} +$$
$$\sum_{k=1}^{m_3}\{(N_{re,k} + 1)^2 + (N_{im,k} - 1)^2\} +$$
$$\sum_{k=1}^{m_4}\{(N_{re,k} + 2)^2 + N_{im,k}^2\} + \sum_{k=1}^{m_5}\{(N_{re,k} + 2)^2 + N_{im,k}^2\} +$$
$$\sum_{k=1}^{m_6}\{(N_{re,k} + 1)^2 + (N_{im,k} + 1)^2\} +$$
$$\sum_{k=1}^{m_7}\{(N_{re,k} + 1)^2 + (N_{im,k} + 1)^2\} + \sum_{k=1}^{m_8}(N_{re,k}^2 + N_{im,k}^2)$$

-continued $$D_{v,1} = \sum_{k=1}^{m_1} \left[\left\{(1+N_{re,k}) - \frac{1}{\sqrt{2}}\right\}^2 + \left(N_{im,k} - \frac{1}{\sqrt{2}}\right)^2\right] +$$

$$\sum_{k=1}^{m_2}\left[\left\{(1+N_{re,k}) - \frac{1}{\sqrt{2}}\right\}^2 + \left(N_{im,k} - \frac{1}{\sqrt{2}}\right)^2\right] +$$

$$\sum_{k=1}^{m_3}\left[\left\{(1+N_{re,k}) + \frac{1}{\sqrt{2}}\right\}^2 + \left(N_{im,k} - \frac{1}{\sqrt{2}}\right)^2\right] +$$

$$\sum_{k=1}^{m_4}\left[\left\{(1+N_{re,k}) + \frac{1}{\sqrt{2}}\right\}^2 + \left(N_{im,k} - \frac{1}{\sqrt{2}}\right)^2\right] +$$

$$\sum_{k=1}^{m_5}\left[\left\{(1+N_{re,k}) + \frac{1}{\sqrt{2}}\right\}^2 + \left(N_{im,k} + \frac{1}{\sqrt{2}}\right)^2\right] +$$

$$\sum_{k=1}^{m_6}\left[\left\{(1+N_{re,k}) + \frac{1}{\sqrt{2}}\right\}^2 + \left(N_{im,k} + \frac{1}{\sqrt{2}}\right)^2\right] +$$

$$\sum_{k=1}^{m_7}\left[\left\{(1+N_{re,k}) - \frac{1}{\sqrt{2}}\right\}^2 + \left(N_{im,k} + \frac{1}{\sqrt{2}}\right)^2\right] +$$

$$\sum_{k=1}^{m_8}\left[\left\{(1+N_{re,k}) - \frac{1}{\sqrt{2}}\right\}^2 + \left(N_{im,k} + \frac{1}{\sqrt{2}}\right)^2\right]$$

Expression 33

Using Expressions 32 and 33, Expression 34 is obtained:

$$D_{v,0} - D_{v,1} = \sum_{k=1}^{m_1}\{(\sqrt{2}-2)N_{re,k} + \sqrt{2}N_{im,k} + \sqrt{2} - 2\} +$$

$$\sum_{k=1}^{m_2}\{\sqrt{2}N_{re,k} + (\sqrt{2}-2)N_{im,k} + \sqrt{2}\} +$$

$$\sum_{k=1}^{m_3}\{-\sqrt{2}N_{re,k} + (\sqrt{2}-2)N_{im,k} - \sqrt{2}\} +$$

$$\sum_{k=1}^{m_4}\{(2-\sqrt{2})N_{re,k} + \sqrt{2}N_{im,k} + 2 - \sqrt{2}\} +$$

$$\sum_{k=1}^{m_5}\{(2-\sqrt{2})N_{re,k} - \sqrt{2}N_{im,k} + 2 - \sqrt{2}\} +$$

$$\sum_{k=1}^{m_6}\{-\sqrt{2}N_{re,k} + (2-\sqrt{2})N_{im,k} - \sqrt{2}\} +$$

$$\sum_{k=1}^{m_7}\{\sqrt{2}N_{re,k} + (2-\sqrt{2})N_{im,k} + \sqrt{2}\} +$$

$$\sum_{k=1}^{m_8}\{(\sqrt{2}-2)N_{re,k} - \sqrt{2}N_{im,k} + \sqrt{2} - 2\}$$

$$= \sum_{n=\frac{2N(v-1)}{U}}^{\frac{2Nv}{U}-1}\{a_n N_{re,n} + b_n N_{im,n} + c_n\}$$

$$= \sum_{n=\frac{2N(v-1)}{U}}^{\frac{2Nv}{U}-1} z_n$$

where $a_n$, $b_n$, $c_n \in \{+\sqrt{2}, -\sqrt{2}, 2-\sqrt{2}, \sqrt{2}-2\}$ and $z_n = a_n N_{re,n} + b_n N_{im,n} + c_n$.

Since $Z_n$ values are statistically independent, $D_{v,0} - D_{v,1}$ for large N may be assumed to have a Gaussian distribution by central limit theorem. It is not easy to calculate mean and variance of $D_{v,0} - D_{v,1}$. However, the mean and variance can be obtained through numerical analysis. Using the mean and variance of $D_{v,0} - D_{v,1}$ by numerical analysis, the DFP can be calculated by Expression 30 for U=4 and Expression 31 for U=8 as $$P_{df,U=4} = 1 - Q\left(\frac{E\{D_{1,0} - D_{1,1}\}}{\sigma_{D_{1,0}-D_{1,1}}}\right)^2$$

Expression 35

$$P_{df,U=8} = 1 - Q\left(\frac{E\{D_{1,0} - D_{1,1}\}}{\sigma_{D_{1,0}-D_{1,1}}}\right)^4 -$$

$$4\int_0^\infty \frac{1}{\sqrt{2\pi}\,\sigma_{D_{1,0}-D_{1,1}}} \exp\left(-\frac{(\alpha - E\{D_{1,0} - D_{1,1}\})^2}{2\sigma_{D_{1,0}-D_{1,1}}}\right)$$

$$Q\left(\frac{\alpha + E\{D_{1,0} - D_{1,1}\}}{\sigma_{D_{1,0}-D_{1,1}}}\right)^3 d\alpha$$

Expression 36

Figure 3:
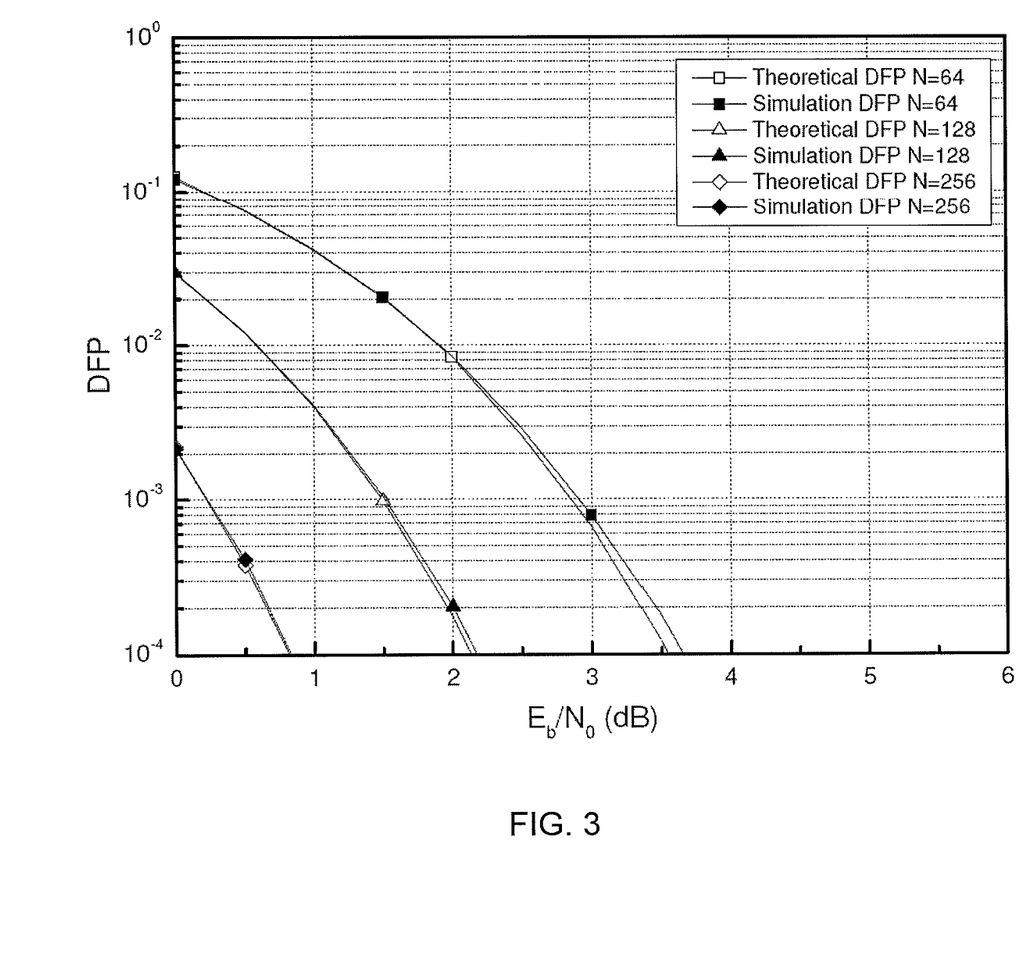
FIG. 3 shows comparison of theoretical and simulated DFPs in the BSLM according to the embodiment of the invention with QPSK and U=4.
Figure 4:
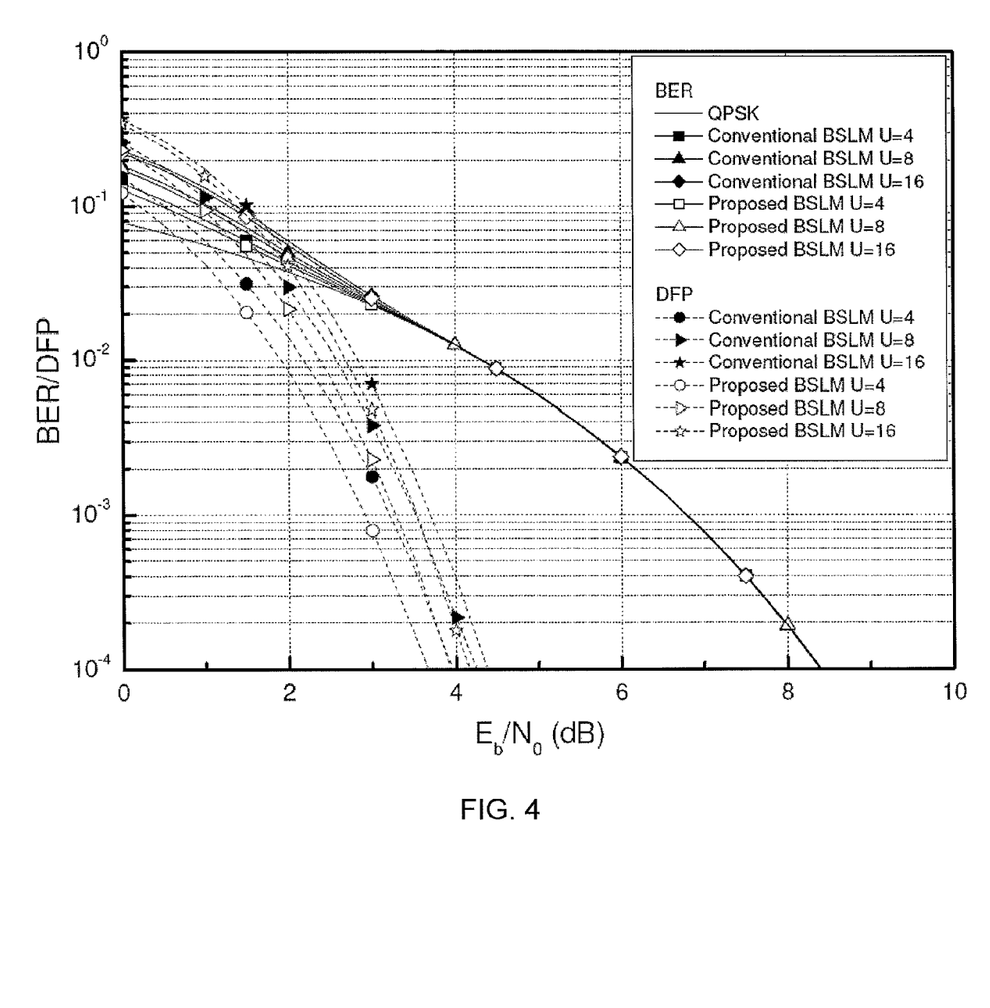
FIGS. 4 to 7 show DFP and BER of the conventional and the BSLM scheme according to the embodiment of the inventions with N=64, 256 modulated by QPSK and 16 QAM.
Figure 5:
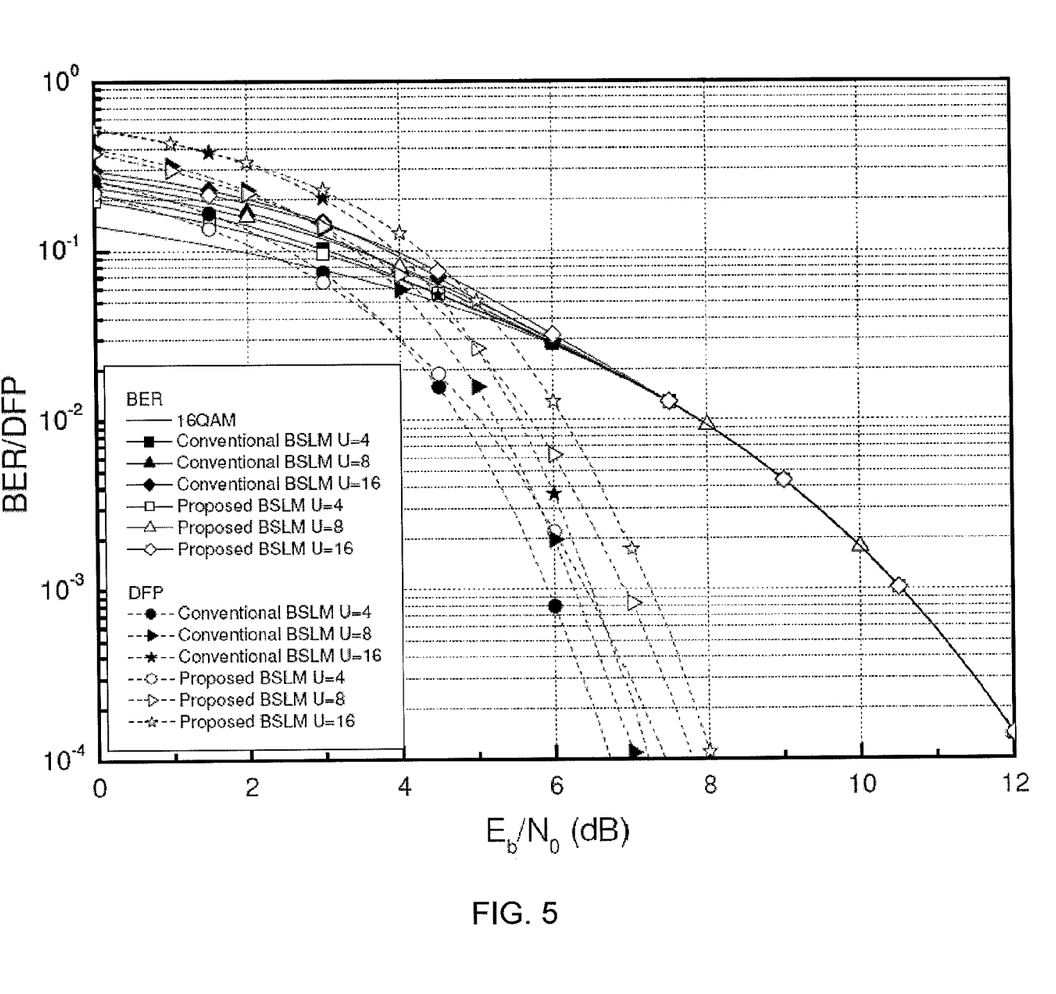
Figure 6:
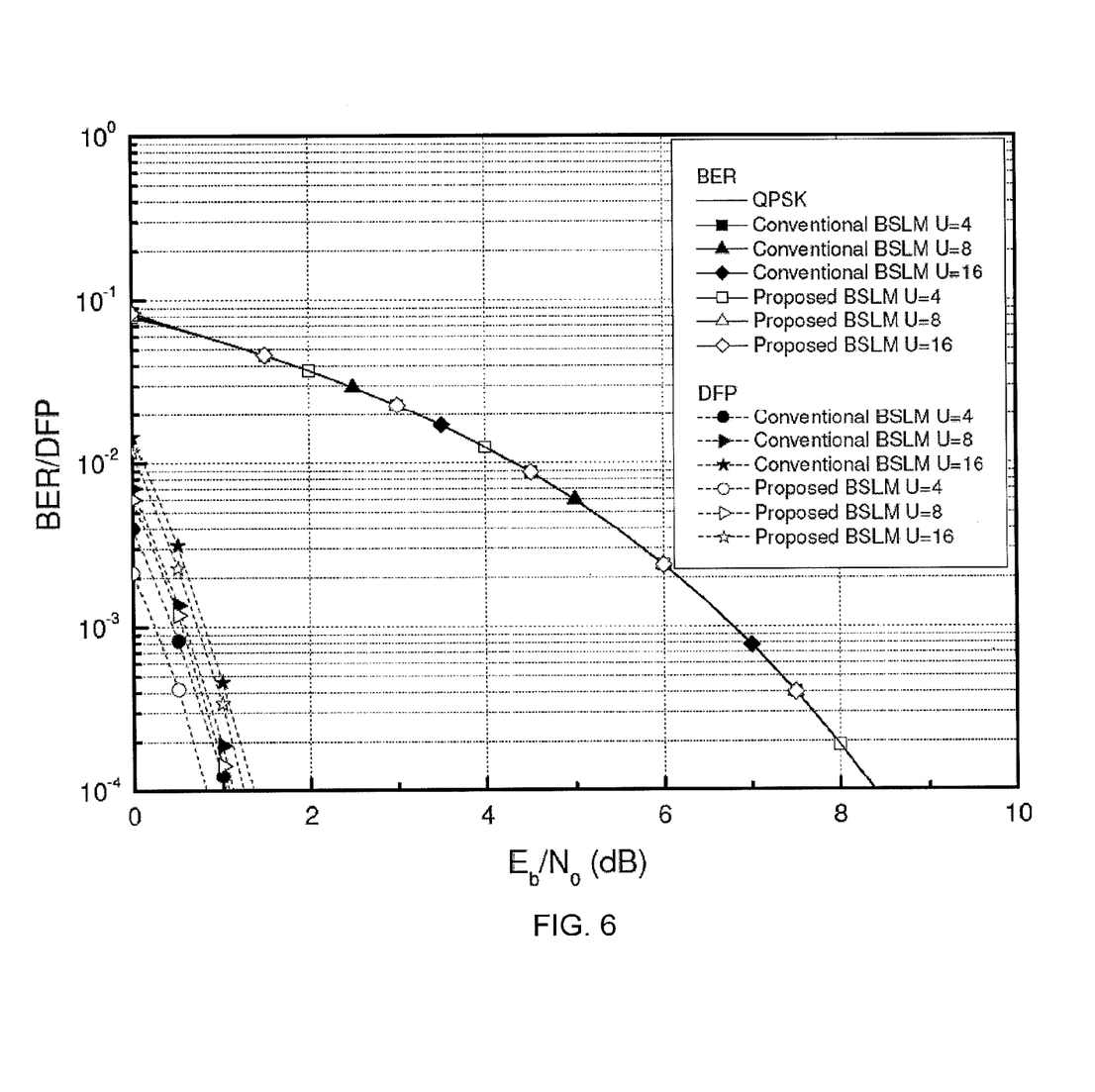
Figure 7:
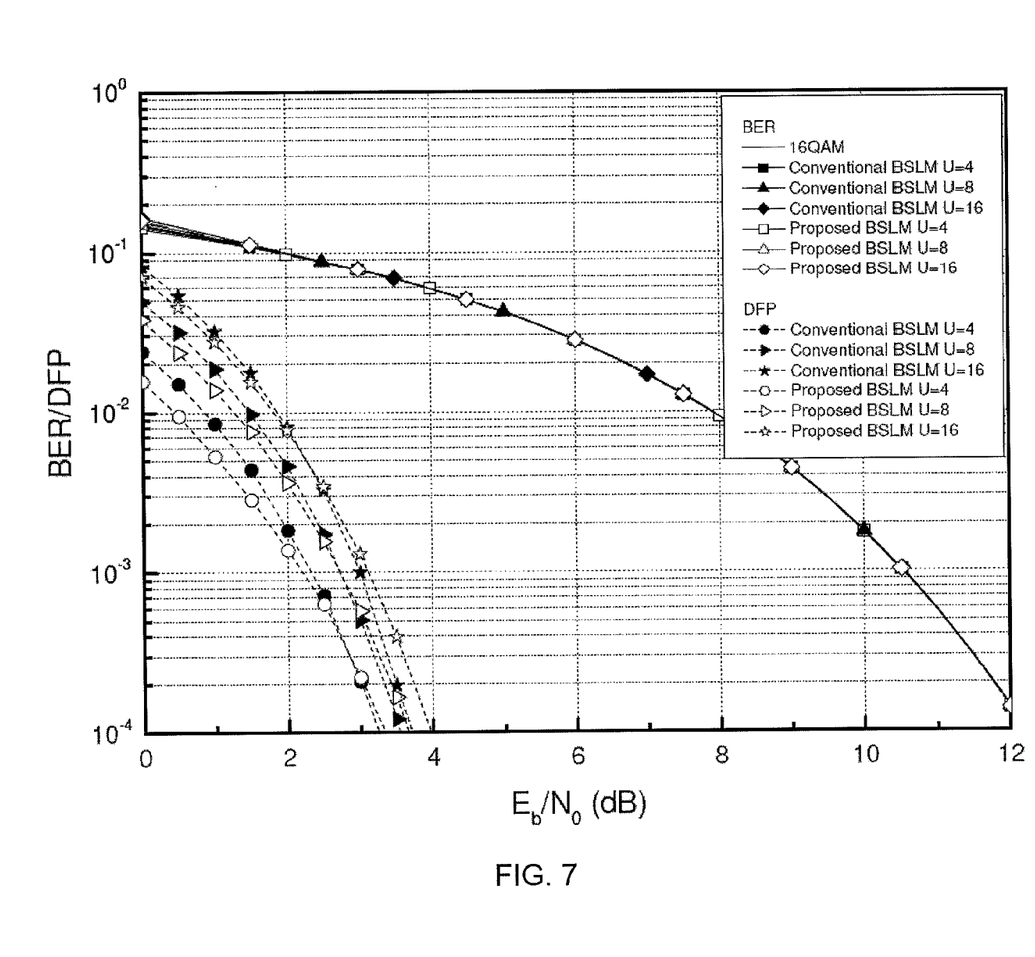

DFP for M-QAM may be derived similar to that for QPSK. FIG. 3 compares theoretical results by Expression 35 with simulation results of DFP for U=4. This shows that analysis of the DFP is suitable for the BSLM according to this invention. If N is large, the negligible detection failure probability in a low SNR region can be observed. Therefore, the decoder of the BSLM according to this invention ensures detection of nearly perfect side information over the AWGN channel.

Last, the simulation results will be described below in more detail.

Simulation is done in the AWGN channel, QPSK and 16-QAM with phase rotation $\theta = \pi/4$, and N=64 and 256. Further, U=4, 8, and 16 are considered. The decoding algorithm using Expressions 10 and 11 is used for the BSLM scheme according to this invention. Further, the decoder in Expression 18 is considered for the BPTS scheme according to this invention.

FIGS. 4 to 7 show DFP of the conventional and the BSLM scheme according to this inventions for N=64, 256 modulated by QPSK and 16 QAM. For small N, such as 64, there exists noticeable DFP degradation for both the conventional BSLM scheme and the BSLM according to this invention at the low SNR region because the number of subcarriers is too small to obtain reliable decision metrics. When N=256, DFP decreases fast and no detection failure of side information for N=1024 is observed in the BSLM according to this invention.

The value of U affects DFP of side information. If U increases, DFP of both BSLM schemes is degraded in the low SNR.

When the conventional BSLM scheme uses large U, the Euclidian distance between the used phase sequence and the others is reduced and thus the DFP of the phase sequence is worsened. Similarly, the large U degrades DFP of the BSLM scheme according to this invention for the same reason. Due to the effect of block partitioning and predetermined phase rotation, DFP of the BSLM scheme according to this invention is better than that of the conventional BSLM scheme in the low SNR for QPSK. However, for 16 QAM and N=256, DFP of the BSLM scheme according to this invention slowly converges to 0 compared with that of the conventional BSLM scheme, because the Euclidean distance between $S_0$ and $S_1$ for 16 QAM is not maximized by $\theta = \pi/4$.

FIGS. 4 to 7 also compare BER performance of the conventional and the BSLM scheme according to this inventions for N=64, 256 modulated by QPSK and 16 QAM. Even though the increased erroneous side information detection degrades BER, BER degradation exists at low SNR for small N and large U. In addition, DFP $P_{df}$ converges to 0 at the BER of $10^{-2}$ in both BSLM schemes. Since the practical OFDM systems require better BER than $10^{-2}$, BER degradation by detection failure in a low SNR can be negligible. In addition, BER in both BSLM schemes for N=256 is not degraded from the detection failure of side information, which is almost negligible.

Figure 8:
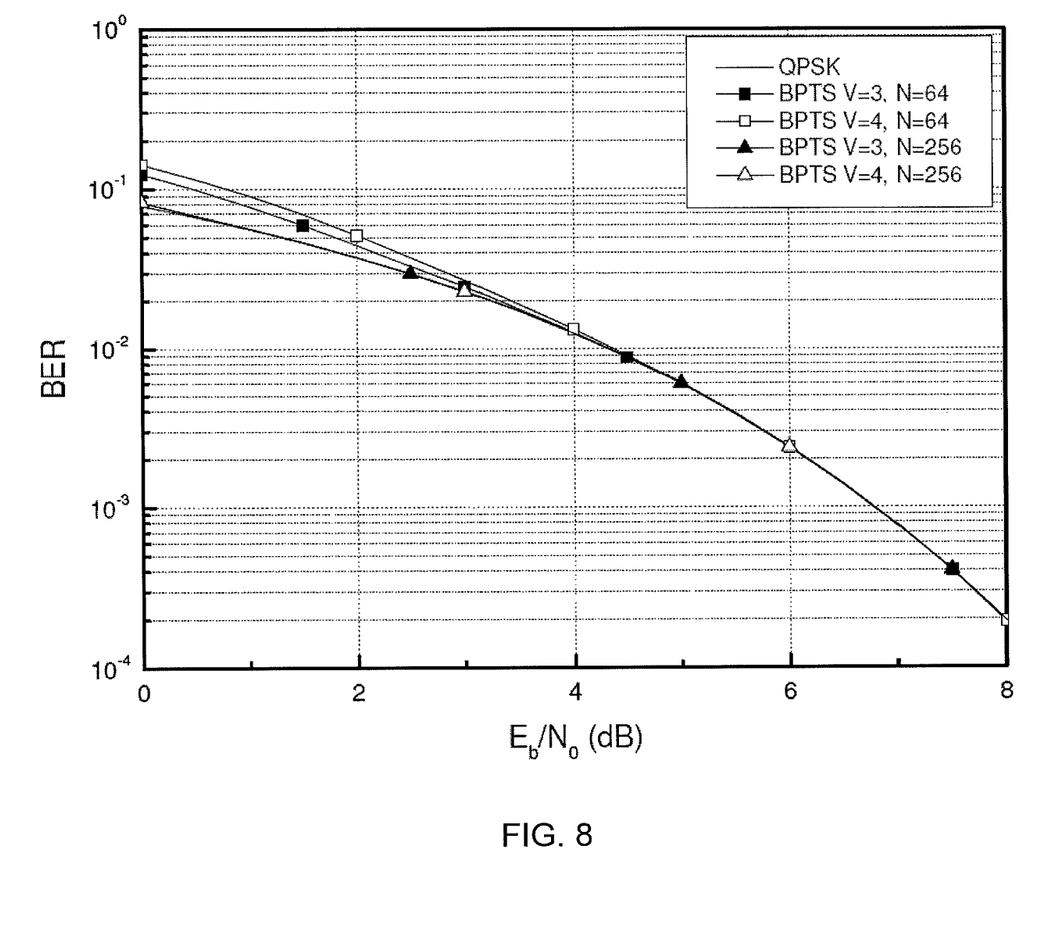
FIG. 8 compares BER performance of the decoder proposed in Expression 18 with the conventional PTS that has perfect side information in the AWGN channel.

FIG. 8 compares BER performance of the decoder proposed in Expression 18 with that of the conventional PTS that has perfect side information in the AWGN channel. Similar to the BSLM according to this invention, the BPTS almost perfectly recovers the received data in the AWGN channel. However, BER degradation also exists in the low SNR for small N and large V similar to the BSLM.

Figure 9:
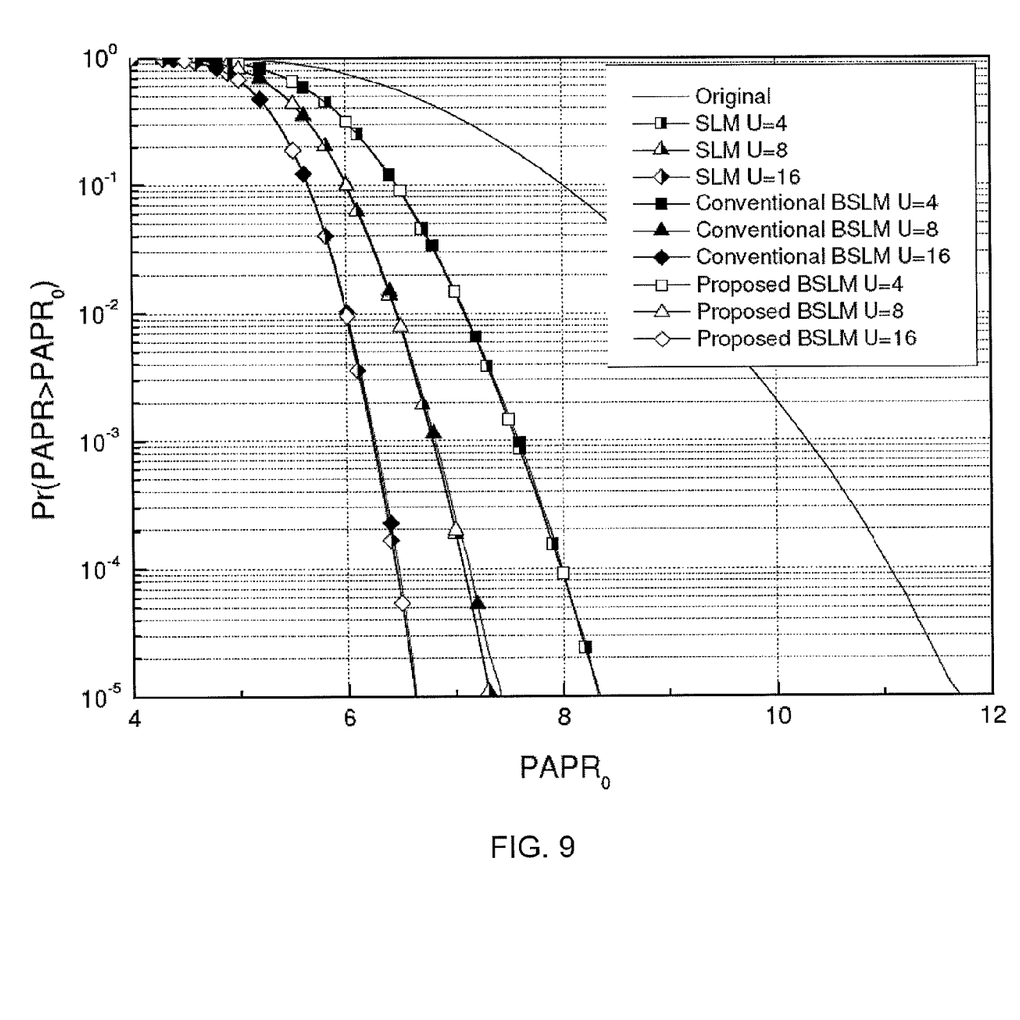
FIG. 9 shows that, for N=64, the BSLM scheme with predetermined phase rotation and block partitioning according to the embodiment of the invention has the same PAPR reduction performance as that of the conventional SLM scheme.

FIG. 9 shows that, for N=64, the BSLM scheme with predetermined phase rotation and block partitioning according to this invention has the same PAPR reduction performance as that of the conventional SLM scheme.

As apparent from the above description, in the BSLM scheme according to the embodiment of the invention, block partitioning and predetermined phase rotation are used to embed side information in an alternative signal sequence, and the BSLM scheme may be extended to the BPTS. Since low decoding complexity is given while detecting the side information, the same BER performance is obtained as that of the conventional BSLM scheme in the AWGN channel.

Further, the performance of PAPR reduction is the same as in the conventional SLM and PTS schemes.

Although some embodiments have been provided to illustrate the invention, it will be apparent to those skilled in the art that the embodiments are given by way of illustration, and that various modifications and equivalent embodiments can be made without departing from the spirit and scope of the invention. The scope of the invention should be limited only by the accompanying claims and equivalents thereof.

What is claimed is:

1. A blind selective mapping (BSLM) method of generating U independent alternative symbol sequences by changing a phase of symbol sequences by phase sequences and transmitting the alternative symbol sequences with a minimum peak to average power ratio (PAPR) in an orthogonal frequency division multiplexing (OFDM) system, in which a transmitter uses m-sequences as the phase sequence and a receiver uses a maximum likelihood (ML) decoder to distinguish the phase sequence used by the transmitter, where U is a number predetermined by the OFDM system, the BSLM method comprising:

partitioning U alternative symbol sequences into U/2 blocks in the transmitter;

rotating phases in each block for each alternative symbol sequence that is an input symbol sequence multiplied by the m-sequence;

selecting a signal sequence with a minimum PAPR among U alternative signal sequences generated by the m-sequences in the transmitter, wherein, after the selecting, an ML decoder in each sub-block calculates a value by two different metrics, the two different metrics being given as $$D_{v,w_v^u} = \sum_{n=\frac{2N(v-1)}{U}}^{\frac{2Nv}{U}-1} \min_{\hat{X}_n \in S_0} |R_n e^{-j\theta w_v^u} - G_n \hat{X}_n|^2$$

where $$w_v^u \in \{0, 1\}, v \in \left\{1, 2, \ldots, \frac{U}{2}\right\},$$

$R_n$ is a received symbol after fast Fourier transform (FFT) demodulation at the receiver, $G_n$ is a frequency response of a fading channel at an n-th subcarrier, and $\hat{X}_n$ is a constellation point of $S_0$, where $D_v, w_v^u$ is a metric value obtained by an ML decoding process for each sub-block, $w_v^u$ represents each element of $W^u$, $W^u$ being the u-th phase rotation vector for sub-blocks, and v represents a position of each element within $W^u$.

2. The BSLM method according to claim 1, wherein the m-sequences are expressed by $$P^u = [P_0^u, P_1^u, \ldots, P_{N-1}^u],$$

where $P^u$ represents a u-th phase sequence which is multiplied to an input symbol sequence per symbol, $P_i^u \in \{+1, -1\}$, $0 \leq i \leq N-1$, $u \in \{1, 2, \ldots, U\}$, and N is a number of subcarriers.

3. The BSLM method according to claim 1, wherein the partitioning comprises dividing a u-th alternative symbol sequence $X \otimes P^u$ into L sub-blocks as $[X_1^u, X_2^u, \ldots, X_L^u]$ if $X = [X_0, X_1, \ldots, X_{N-1}]$, where $$X_v^u = \left[X_{\frac{N(v-1)}{L}} P_{\frac{N(v-1)}{L}}, X_{\frac{N(v-1)}{L}+1} P_{\frac{N(v-1)}{L}+1}, \ldots, X_{\frac{Nv}{L}-1} P_{\frac{Nv}{L}-1}\right]$$

is the v-th sub-block with size N/L, wherein

X represents an input symbol sequence, $P^u$ represents a u-th phase sequence which is multiplied to an input symbol sequence per symbol, $X_N$ represents a symbol loaded on each subcarrier, $X_v^u$ resents the v-th sub-block of an alternative symbol sequence generated by componentwise multiplication of input symbol sequence and phase sequence, a sub-block comprised of N/L number of sequential symbols where N is a number of subcarriers and L is a number of sub-blocks.

4. The BSLM method according to claim 1, wherein, in the rotating phases in blocks, if U L-tuple phase rotation vectors are defined as $W^u = [w_1^u, w_2^u, \ldots, w_L^u]$, where $w_v^u \in \{0, 1\}$, $1 \leq u \leq U$ and $1 \leq v \leq L$, each element in a v-th sub-block of the u-th alternative symbol sequence is multiplied by $e^{\theta w_v^u}$, where $0 < \theta \leq \pi/2$ and $1 \leq v \leq L$, such that each element in the sub-blocks with $w_v^u = 0$ is modulated by using a signal constellation $S_0$ and each element in the sub-blocks with $w_v^u = 1$ is modulated using a signal constellation $S_1$, where $W^u$ is the u-th phase rotation vector for sub-blocks, $w_v^u$ represents each element of $W^u$, and v represents a position of each element within $W^u$.

5. The BSLM method according to claim 4, wherein the phase rotation vectors comprise U bi-orthogonal vectors of length L=U/2.

6. The BSLM method according to claim 1, wherein, after the calculation, the ML decoder calculates and derotates the alternative symbol sequence by a decision metric and finally decides an input symbol sequence, the decision metric being given as $$D_{\tilde{u}} = \min_{W^{u}} \sum_{v=1}^{\frac{U}{2}} D_{v, w_{v}^{u}}.$$

* * * * *